United States Patent
Chen (10) Patent No.: US 12,474,969 B2
(45) Date of Patent: Nov. 18, 2025

(54) DETECTION OF INSTANCE LIVENESS

(71) Applicant: Nokia Solutions and Networks Oy, Espoo (FI)

(72) Inventor: Pingan Chen, Qingdao (CN)

(73) Assignee: Nokia Solutions and Networks Oy, Espoo (FI)

( * ) Notice: Subject to any disclaimer, the term of this patent is extended or adjusted under 35 U.S.C. 154(b) by 657 days.

(21) Appl. No.: 17/634,325

(22) PCT Filed: Aug. 15, 2019

(86) PCT No.: PCT/CN2019/100877
§ 371 (c)(1),
(2) Date: Feb. 10, 2022

(87) PCT Pub. No.: WO2021/026923
PCT Pub. Date: Feb. 18, 2021

(65) Prior Publication Data
US 2022/0291968 A1    Sep. 15, 2022

(51) Int. Cl.
*G06F 9/50* (2006.01)
*G06F 11/30* (2006.01)

(52) U.S. Cl.
CPC ........ *G06F 9/5072* (2013.01); *G06F 11/3006* (2013.01); *G06F 11/3055* (2013.01);
(Continued)

(58) Field of Classification Search
CPC .................................................. G06F 9/5072
See application file for complete search history.

(56) References Cited

U.S. PATENT DOCUMENTS 6,996,502 B2 * 2/2006 De La Cruz ........ G06F 11/0748
714/E11.073
7,466,662 B2  12/2008 Kakivaya et al.
(Continued)

FOREIGN PATENT DOCUMENTS

| | | |
|---|---|---|
| CN | 101118489 A | 2/2008 |
| CN | 102081548 A | 6/2011 |
| WO | 2005/060127 A1 | 6/2005 |

OTHER PUBLICATIONS

Zhuang et al., "On Failure Detection Algorithms in Overlay Networks", Proceedings IEEE 24th Annual Joint Conference of the IEEE Computer and Communications Societies, Mar. 13-17, 2005, pp. 2112-2123.
(Continued)

*Primary Examiner* — Charlie Sun
(74) *Attorney, Agent, or Firm* — DITTHAVONG, STEINER & MLOTKOWSKI (57) ABSTRACT

According to a method, at a given instance of a cluster of instances of at least one service, at least one monitored instance is selected from the cluster of instances according to a selection criterion such that each instance of the cluster of instances is selected as a monitored instance by at least one other instance of the cluster of instances. The given instance is caused to detect an operational status of the at least one monitored instance. If the operational status indicates that one of the at least one monitored instance is failed, the operational status of the failed monitored instance is provided to a centralized controller for the cluster of instances. Through the solution, the detection of instance liveness can be executed by individual instances symmetrically in a distributed and self-management manner.

20 Claims, 5 Drawing Sheets

(52) U.S. Cl.
CPC .............. *G06F 2209/5015* (2013.01); *G06F 2209/5016* (2013.01); *G06F 2209/503* (2013.01); *G06F 2209/505* (2013.01); *G06F 2209/508* (2013.01)

(56) References Cited

U.S. PATENT DOCUMENTS

| | | |
|---|---|---|
| 2007/0237089 A1 | 10/2007 | Chen et al. |
| 2008/0291837 A1 | 11/2008 | Chang et al. |
| 2010/0107002 A1 | 4/2010 | Kakivaya et al. |
| 2019/0158585 A1* | 5/2019 | Djakovic ............ H04L 67/1019 |

OTHER PUBLICATIONS

Castro et al., "One Ring to Rule Them All: Service Discovery and Binding in Structured Peer-to-peer Overlay Networks", Proceedings of the 10th workshop on ACM SIGOPS European workshop, Sep. 2002, 6 pages.

International Search Report and Written Opinion received for corresponding Patent Cooperation Treaty Application No. PCT/CN2019/100877, dated May 14, 2020, 10 pages.

\* cited by examiner

DETECTION OF INSTANCE LIVENESS

RELATED APPLICATION

This application was originally filed as PCT Application No. PCT/CN2019/100877 on Aug. 15, 2019, each of which is incorporated herein by reference in its entirety.

FIELD

Embodiments of the present disclosure generally relate to the field of service-based computing and in particular, to a method, device, apparatus and computer readable storage medium for detecting of instance liveness.

BACKGROUND

Service discovery generally relates to enabling devices to announce, discover or otherwise control their services and/or the services offered or available from other devices. In cloud native applications, services are usually provided by a cluster of multiple instances that provide the corresponding services either internally or externally. This architecture requires some type of dynamic service discovery for clients to discover the access address of the instances. In the service discovery procedure, each instance will publish its service-related information (referred to as a service data entry) through broadcasting or via a centralized storage. Other entities may either receive or subscribe to a notification of update of such service-related information and thus are able to communicate with that instance (for example, requesting the function provisioned by the instance).

SUMMARY

In general, example embodiments of the present disclosure provide a solution for detecting of instance liveness.

In a first aspect, there is provided a computer-implemented method. The method comprises at a given instance of a cluster of instances of at least one service, selecting at least one monitored instance from the cluster of instances according to a selection criterion such that each instance of the cluster of instances is selected as a monitored instance by at least one other instance of the cluster of instances; causing the given instance to detect an operational status of the at least one monitored instance; and providing, based on the operational status indicating that one of the at least one monitored instance is failed, the operational status of the failed monitored instance to a centralized controller for the cluster of instances.

In a second aspect, there is provided an electronic device. The device comprises at least one processor; and at least one memory including computer program code; where the at least one memory and the computer program code are configured to, with the at least one processor, cause the device to, at a given instance of a cluster of instances of at least one service, select at least one monitored instance from the cluster of instances according to a selection criterion such that each instance of the cluster of instances is selected as a monitored instance by at least one other instance of the cluster of instances, cause the given instance to detect an operational status of the at least one monitored instance, and provide, based on the operational status indicating that one of the at least one monitored instance is failed, the operational status of the failed monitored instance to a centralized controller for the cluster of instances.

In a third aspect, there is provided an apparatus. The apparatus comprises means for selecting, at a given instance of a cluster of instances of at least one service, at least one monitored instance from the cluster of instances according to a selection criterion such that each instance of the cluster of instances is selected as a monitored instance by at least one other instance of the cluster of instances; means for causing the given instance to detect an operational status of the at least one monitored instance; and means for providing, based on the operational status indicating that one of the at least one monitored instance is failed, the operational status of the failed monitored instance to a centralized controller for the cluster of instances.

In a fourth aspect, there is provided a non-transitory computer readable medium comprising program instructions for causing an apparatus to perform at least the method according to the above first aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
 (a) hardware-only circuit implementations (such as implementations in only analog and/or digital circuitry) and
 (b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
 (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "cloud computing" refers to a networking-based computing environment where shared computing resources, software and information are provided to computing nodes and other devices on-demand, like a public utility. The computing resources are dynamically scalable and accessible via a network, such as the Internet. The computing resources, often referred to as a "cloud," provide one or more services to users. These services may be categorized according to service types, which may include for examples, applications/software, platforms, infrastructure, virtualization, and servers and data storage. The names of service types are often prepended to the phrase "as-a-Service" such that the delivery of applications/software and infrastructure, as examples, may be referred to as Software-as-a-Service (SaaS) and Infrastructure-as-a-Service (IaaS), respectively.

In general, cloud computing customers do not own the physical infrastructure. Instead customers can avoid capital expenditure by renting usage from a third-party provider. They consume resources as a service and pay only for resources that they use. Many cloud-computing offerings employ the utility computing model, which is analogous to how traditional utility services (such as electricity) are consumed, whereas others bill on a subscription basis. Sharing "perishable and intangible" computing power among multiple tenants offer the promise of improving utilization rates, as servers are not unnecessarily left idle (which can reduce costs significantly while increasing the speed of application development).

As used herein, the term "service" is a broad and generic nomenclature intended to encompass any capability of such logically functioning constructs (such as applications, executables, operating systems or the like) to facilitate delivering content/data, performing operations or otherwise assisting another device, application or service. Typical service providers design and provision their services using computing resources consumed from a public or private computing environment. As some examples, a service can be any type of network function service, web service, identity management service, firewall or other security service, messaging service, data storage or backup service, file maintenance service, or any other service that can be made available to users of the computing environment. It should be appreciated that other services associated with or otherwise supported by a computing environment are envisioned.

The term "cloud-based service" or, more simply, "cloud services" refers not only to services provided in a cloud computing environment, but also to a form of service provisioning in which cloud customers contract with cloud service providers for the online delivery of services provided by the cloud. Cloud service providers manage a public, private, or hybrid cloud to facilitate the online delivery of cloud services to one or more cloud customers.

As used herein, an "instance" of a service or a "service instance" can refer to the service that is launched, initiated, hosted, executed, or provisioned in the computing environment. One or more instances of a same service can be provided to handle requests for the service that come by batch. Each instance in the service has the same service definition of the corresponding service and thus may be considered as the same service for the end user. As such, it is possible to achieve a high throughput capacity and serve more users.

Figure 1:
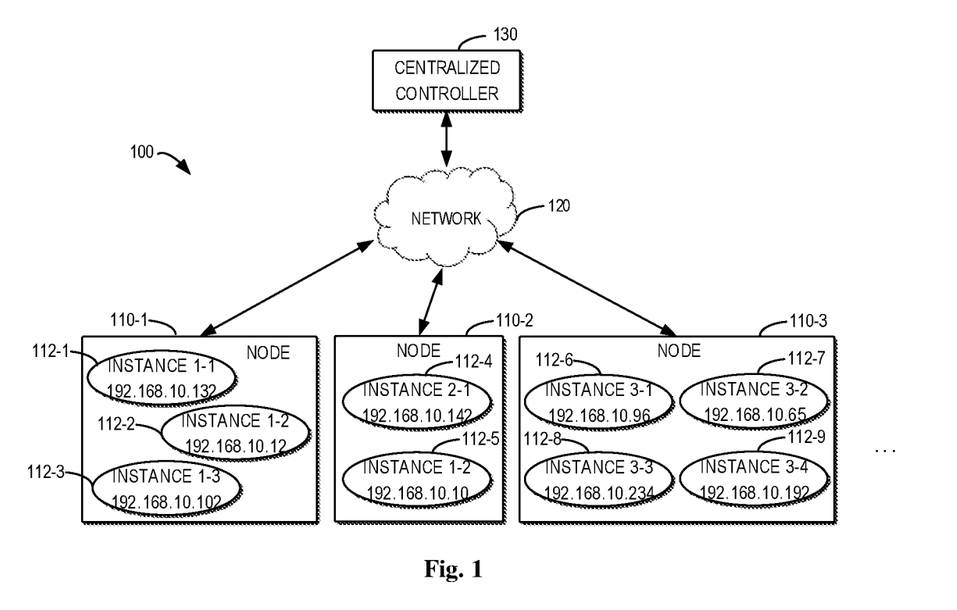
FIG. 1 illustrates an example environment in which example embodiments of the present disclosure may be implemented.

FIG. 1 illustrates an example computing environment 100 in which example embodiments of the present disclosure may be implemented. The computing environment 100 can be implemented as a distributed computing environment supported by a variety of computing nodes/devices. An example of the computing environment 100 may include a cloud computing environment. In the computing environment 100, a plurality of computing nodes, such as computing nodes 110-1, 110-2, 110-3, are included to host a plurality of instances 112-1 to 112-9 of one or more different services. For ease of description, the computing nodes 110-1, 110-2, and 110-3 are collectively or individually referred to as computing nodes 110, and the instances 112-1 to 112-9 are collectively or individually referred to as instances 112.

The computing nodes 110 may be any type of general-purpose or special-purpose computing devices, servers, mainframe computer systems, and/or the like that can provide infrastructure resources for the instances 112 to operate. The infrastructure resources may include computing resources, network resources, storage resource, and the like. As illustrated, each of the computing nodes 110 may have one or more instances 112 launched thereon. The instances 112 may be provisioned on the computing nodes 110 using virtual machine (VM) technologies or container technologies. The instances 112 hosted by the same or different computing nodes 110 may be considered as independent logical entities that can communicate, via a network 120, with different instances 112 or other instances launched in the computing environment 100.

The instances 112 can also communicate with a centralized controller 130 via the network 120. The centralized controller 130 may be configured to control and manage registration (or initiation) of the instances 112 and service discovery of the instances 112. The centralized controller 130 may be provisioned as a service instance in the computing environment 100.

It is to be understood that the number of computing nodes and the number of instances hosted on each of the computing nodes are only for the purpose of illustration without suggesting any limitations. The computing environment 100 may include any suitable number of computing nodes and instances launched thereon. Although not shown, it would be appreciated that only one instance may be hosted by a computing node 110.

It is also to be understood that although this disclosure includes a detailed description on cloud computing, implementation of the teachings recited herein are not limited to a cloud computing environment. Rather, example embodiments of the present invention are capable of being implemented in conjunction with any other type of computing environment now known or later developed.

In the computing environment, as mentioned above, a service discovery procedure is required to allow clients to discover the access address of the instances. During the service discovery procedure, each instance will publish its service-related information (i.e., a service data entry) and other entities (such as other instances or computing nodes hosting the instances) may obtain a notification of update of such service data entry and thus are able to communicate with that instance. One potential issue for the service discovery is that if one or more of the instances are failed (for example died or crashed) and become unavailable without proactively clearing up its published service data entry, other instances will not be notified of the failure and thus still sending requests to the failed instances, resulting in service failures.

There have been proposed several solutions to address the issue caused by failed instances. Some of the solutions require a third-party component to implement liveness detection, for example, by configuring respective lease timers to indicate time to live (TTL) values of instances or by launching an independent monitor service to detect liveness of the instances. The third-party component could be failed, thereby reducing the reliability and stability of the liveness detection. Some other solutions are proposed to select a leader among a plurality of instances to monitor the status of all the other instances. However, differentiating roles of instances (a leader and normal members) may increase the complexity in the service design phrase. In some cases, there is still a risk of no leader being elected, which may lead to an unstable status.

According to some example embodiments of the present disclosure, there is provided a solution for detecting of instance liveness. In this solution, liveness detection is performed within a cluster of instances. For any given instance of the cluster of instances, one or more monitored instances are selected according to a selection criterion. By following this selection criterion, each instance of the cluster is selected as a monitored instance for at least one other instance in the cluster. Each instance of the cluster of instances detects operational status of its monitored instance(s). If an instance detects that one of its monitored instance(s) is failed, the instance causes an update of the operational status of the failed monitored instance to a centralized controller. The centralized controller thus may notify the update of the operational status to other instances. Through the solution, detection of instance liveness in a cluster of instances is performed by the instances themselves in a distributed and self-management manner, without requiring any support of third-party logic or defining a special role for an instance in the cluster to perform the liveness detection.

Figure 2:
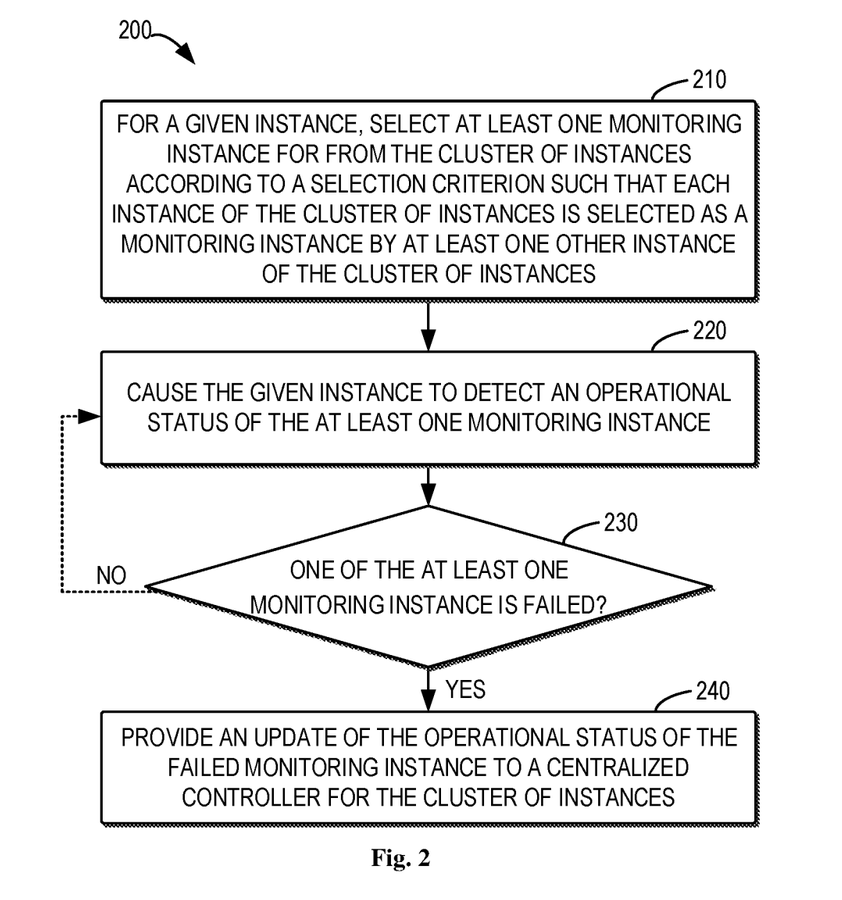
FIG. 2 illustrates a flowchart illustrating a process for detection of instance liveness according to some example embodiments of the present disclosure.

Principle and embodiments of the present disclosure will be described in detail below with reference to the accompanying drawings. Reference is now made to FIG. 2, which shows a process 200 for detecting of instance liveness according to some example embodiments of the present disclosure. For the purpose of discussion, the process 200 will be described with reference to FIG. 1. The process 200 may be implemented by an instance 112 logically as each launched instance can operate independently as a virtual machine. Alternatively, the process 200 may be considered as being implemented at a physical computing node 110 on which an instance 112 is hosted as the computing node 110 provisions physical resources for the instance 112 to operate. For ease of description, the process 200 will be discussed from the perspective of an instance 112 although it may also be considered as being performed by the corresponding computing node 110.

The process 200 is performed for any individual instance 112 in a cluster of instances 112. In some example embodiments, each instance 112 in the cluster may perform the process 200. The cluster of instances 112 are those that are managed together for liveness detection. The cluster of instances 112 may include a plurality of instances launched for the same service or for two or more different services. In an example, the cluster of instances 112 may include instances of a plurality of different services for a same application. In another example, the cluster of instances 112 may include instances of services for different applications. There is no limitation on the cluster of instances 112 that are managed together. In the following, some examples are described by aggregating instances 112-1 to 112-9 in FIG. 1 as a cluster of instances.

At block 210, the given instance 112 in the cluster selects at least one monitored instance from the cluster of instances 112 according to a selection criterion. The instance 112 will monitor an operational status of the one or more monitored instances to detect their liveness. According to the example embodiments of the present disclosure, the selection criterion applied by each instance 112 is configured in such a way that each instance in the cluster of instances 112 is selected as a monitored instance by at least one other instance of the cluster of instances. Therefore, each of the instances 112 can be monitored by one or more instances 112 within the cluster, thereby ensuring full coverage of all instances 112 in the cluster. In an example embodiment, one instance 112 is selected to be monitored by two or more other instances for purpose of better redundancy.

The selection criteria applied by instances 112 in the cluster may be the same or different as long as each instance 112 in the cluster can be selected as a monitored instance for one or more other instances. In an example embodiment, each instance 112 may select all the other instances in the cluster as its monitored instances.

In an example embodiment, to facilitate the selection of the monitored instance(s), a sorting criterion may be used by the given instance 112 to sort the cluster of instances 112. The sorting of the cluster of instances 112 may be performed according to a sorting criterion. The sorting criterion is shared by the cluster of instances 112 such that the sorting result at each instance 112 is the same. The same sorting criterion can ensure that the basis for selection of a monitored instance (i.e., the resulting sorted instances) is the same at each instance 112. The same sorting result at each instance 112 can make it easier to define the selection criterion for use by the instance 112 to select its monitored instance(s) and ensure the full coverage of all the instances 112 in the cluster.

In some example embodiments, the sorting of the cluster of instances 112 may be based on information related to the respective instances 112 in the cluster. Specifically, each instance 112 may obtain information related to respective instances 112 in the cluster from an entity, such as the centralized controller 130, which is configured to handle the storage and provision of the instance-related information. Such information may sometimes be referred to as a service data entry of an instance. In some examples, the information related to an instance 112 may include an access address of the instance, such as an Internet Protocol (IP) address through which the instance 112 can be accessed. The information related to an instance 112 may alternatively or additionally include an identification of a node on which the instance 112 is hosted, such as a computing node 110, an identification of the corresponding service, and/or any other information related to the instance 112.

A given instance 112 in the cluster may utilize one or more items in the obtained information related to the respective instances 112 to sort the cluster of instances 112. Which items in the information are used may depend on the sorting criterion. That is, different sorting criteria may be configured to using different combinations of the information related to the respective instances to perform the instance sorting.

In some example embodiments, the sorting criterion may be fixed at each instance 112 in the cluster. In some other example embodiments, the sorting criterion may be dynamically configured for all the instances 112 in the cluster, for example, by the centralized controller 130 or any other controller in the computing environment 100.

In some embodiments, instead of performing the sorting based on the sorting criterion, an instance 112 may directly receive the sorting result of all the instances 112 in the cluster from the centralized controller 130. The sorting result may be dynamically changed and the changed sorting result may also be provided by the centralized controller 130 to the instance 112.

A given instance 112 in the cluster can select one or more monitored instance from the sorted instances according to the selection creation. On the basis of the cluster of sorted instances 112, there are many feasible selection criteria that can be applied to ensure the full coverage after each instance 112 in the cluster selects its monitored instance(s). In an example embodiment, for an instance 112, one or more instances sorted to be adjacent to this instance 112 can be selected as its monitored instance(s).

For example, an instance 112 may select one or more next instances among the cluster of sorted instances as its monitored instance(s). All the sorted instances may be treated as circular linked so the last instance may select from the starting of the sorting order (for example, select the first one or more instances as its monitored instance(s)). In other examples, each instance 112 may also select its previous instance(s) as its monitored instance(s). The first instance may select from the ending of the sorting order (for example, select the one or more last instances as its monitored instance(s)). In those examples, each instance 112 may select the same number of monitored instances or a different number of monitored instances. The selection criterion based on the adjacent instance(s) is beneficial in various aspects. For example, this selection criterion is a simple and effective rule to meet the requirement of full coverage in terms of monitored instance selection with high performance. In addition, the circular adjacent based selection criterion is agnostic to the aforementioned sorting criterion, it can fit well with any sorting criterion used and will fulfill the full coverage requirement.

Figure 3A:
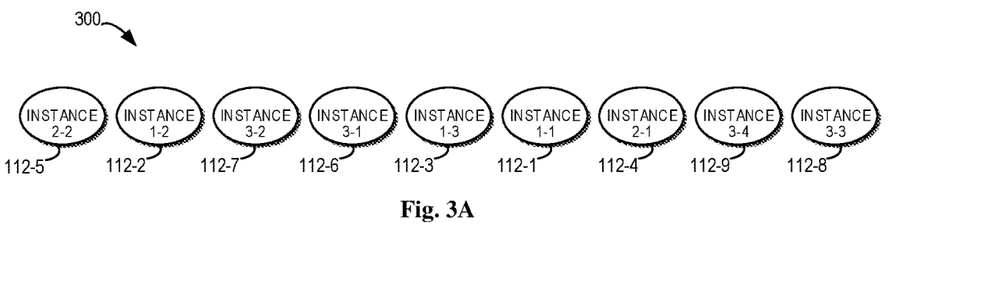
FIG. 3A illustrates an example sorting result of a cluster of instances according to some example embodiments of the present disclosure.
Figure 3B:
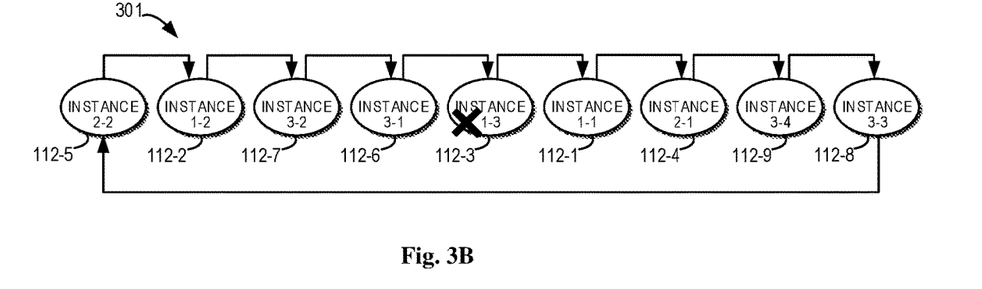
FIGS. 3B-3D illustrate some example monitoring relationships among a cluster of instances according to some example embodiments of the present disclosure.

FIG. 3A shows an example of a sorting result 300 of the cluster of instances 112-1 to 112-9. In this example, the instances 112-1 and 112-9 are sorted according to their IP addresses (those illustrated in FIG. 1 in conjunction with the respective instances 112). Based on the sorting result 300, each instance 112 in the cluster selects one next instance as its monitored instance. As such, a monitoring relationship 301 among the cluster of instances 112-1 to 112-9 is shown in FIG. 3B. In FIG. 3B, an instance to which an arrow points is a monitored instance for an instance from which the arrow originates.

Referring back to FIG. 2, at block 220, the given instance 112 is caused to detect an operational status of the at least one monitored instance. Each instance 112 within the cluster may be configured with an instance liveness detection function that can be initiated to check the readiness/heath of its monitored instance(s). The operational status of an instance 112 may include an active status in which the instance 112 can operate to perform its corresponding task/function, and a failed status in which the instance 112 fails to perform normal operation. Various approaches can be utilized by the instance 112 to detect the operational status of other instances and the scope of the example embodiments of the present disclosure is not limited in this regard.

Upon detection of the operational status, at block 230, the given instance 112 determines whether the operational status indicates that one or more of the at least one monitored instance is failed. At block 240, the given instance 112 provides, based on failure of a monitored instance(s), the operational status of the failed monitored instance(s) to a centralized entity, such as the centralized controller 130, which is configured for managing the cluster of instances 112.

For example, in FIG. 3B, it is assumed that the instance 112-3 is failed. The instance 112-3 is monitored by the instance 112-6. By performing the liveness detection, the instance 112-6 can detect that the operational status of the instance 112-3 indicates a failed status. Thus, the instance 112-6 may report such operational status to the centralized controller 130.

The detection of the operational status of the monitored instance(s) may be performed by an instance 112 in the cluster periodically or upon any other event trigger. For example, if no failure is detected in a first round of detection, the instance 112 may continue to detect all the monitored instance(s) in another round of detection. The time intervals of the two rounds of detection may be configured by the instance 112 or by a centralized entity, such as the centralized controller 130.

The centralized controller 130 may maintain the operational status of all the instances 112 in the cluster and possibly information related to the instances 112. If the centralized controller 130 receives the failed status of one or more instances 112 monitored by one or more other instances 112, it may update the operational status of those instances 112 as failed. If the centralized controller 130 is configured for service discovery of the instances 112 in the cluster, it may also delete the information related to the failed instance(s) (such as their service data entries). As such, the failed instance(s) may not be discovered by other instances (including the remaining active instances 112), thereby avoiding future service failure.

Through the process 200, the detection of instance liveness can be executed by each individual instance symmetrically in a distributed and self-management manner. As mentioned above, the process 200 may be performed by each instance 112 to select its monitored instance(s) within the cluster, detect the operational status of the monitored instance(s), and report the failure of the monitored instance (s). During the whole process, each instance in the cluster is equally important for the detection without requiring any third-party capabilities for liveness check and multicast communication among the instances. It would be appreciated that in some example embodiments, not all the instances in the cluster must necessarily perform the process 200 as long as each instance in the cluster is monitored by at least one other instance in the cluster.

In some example embodiments, the centralized controller 130 may notify such update to all the instances 112 in the cluster that remain active. Specifically, for each instance 112 that is active, it may receive cluster update information from the centralized controller 130. The cluster update information may indicate that one or more instances may be deleted from the cluster due to failure. Upon receipt of such cluster update information, the remaining active instances 112 may be notified of a new cluster for further detection.

In some example embodiments, if one or more further instances of the same services for one or more instances 112 or one or more further instances of at least one new service are to be managed in one cluster with existing instances 112, the centralized controller 130 may also transmit cluster update information to indicate addition of the one or more further instances into the cluster. In some example embodiments, if one or more existing instances 112 in the cluster are determined to be deleted from the cluster (due to other reasons than instance failure detected), the centralized controller 130 may transmit cluster update information to indicate the deletion of such instance(s) 112 from the cluster.

In an example embodiment, the cluster update information can simply indicate which instances are included in the cluster. In an example embodiment, the cluster update information may include information related to respective instances that still can be included in the cluster. For those instances that are excluded from the cluster, their information may not be notified again by the centralized controller 130.

If the cluster is updated, for example, by deleting one or more (failed) instances or addition of one or more new instances, the process 200 may be re-executed by each instance 112 in the cluster. In this way, by dynamic and continuous detection, the potential failure of the instances can be detected and reported to avoid service failure in the following service provision.

Figure 3C:
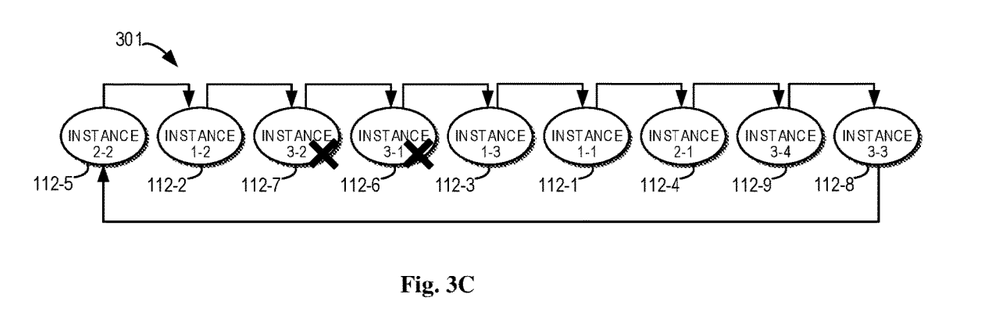

The periodic detection can facilitate detection of simultaneous failure of more than one instance in some cases. For example, as shown in FIG. 3C, it is assumed that the instance 112-7 and 112-6 are both failed. The monitoring relationship 301 among the instances 112-1 to 112-9 is the same as described with reference to FIG. 3B. The failure of the instance 112-7 is detected by the instance 112-2 and reported to the centralized controller 130. Due to the failure of the instance 112-7, the operational status of the instance 112-6 is not detected and notified to the centralized controller 130. As such, the centralized controller 130 may transmit cluster update information indicating deletion of only the instance 112-7 from the cluster.

Figure 3D:
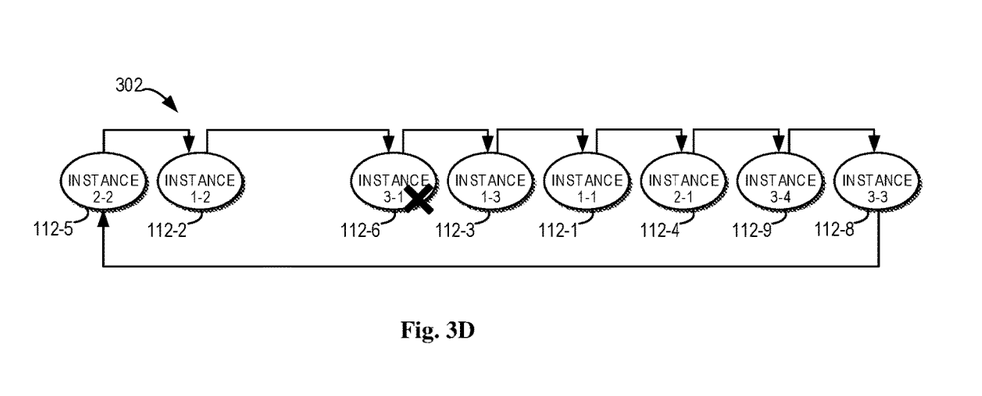

All the remaining active instances 112 in the cluster may continue to sort the instances 112 in the cluster and select their monitored instance in a next cycle. At this time, since the active instances 112 are not notified of the deletion of the instance 112-6, this instance 112-6 is still taken into account during the sorting, selection, and monitoring steps. The resulting monitoring relationship 302 is as shown in FIG. 3D, where the instance 112-2 selects the instance 112-6 as its monitored instance because instance 112-6 is sorted as a next instance to the instance 112-2. After performing the liveness detection, the instance 112-2 can detect the failure of the instance 112-6 and report the failure to the centralized controller 130.

It would be appreciated that depending on the sorting criteria, the simultaneous failure of multiple instances can also be found in one round of detection if those instances can be selected and monitored by other instances. For example, if the instance 112-6 is not only selected by the instance 112-7 but also selected by another instance (such as the instance 112-2) as their monitored instance, one round of detection by all the instances 112-1 to 112-9 can find out the two failed instances.

In some example embodiments, it is found that simultaneous failure of multiple instances is usually due to failure of a computing node. To reduce the delay occurred in finding the failed instance, in some example embodiments, when selecting the monitored instance(s) for each instance 112, if the instances 112 in the cluster are hosted by a plurality of computing nodes (such as the computing nodes 110-1 to 110-3), the selection criterion is configured such that the at least two instances hosted by a first computing node are selected by at least one second different computing node. In other words, an instance hosted by a computing node may not select other instances hosted by the same computing node as its monitored instances. Instead, instances hosted by one computing node are selected by instances hosted by one or more different computing nodes as their monitored instances.

The selection criteria and/or the sorting criteria can be specifically configured to make sure that an instance hosted by a computing node may not select other instances hosted by the same computing node as its monitored instances. In an example embodiment where an instance selects its adjacent instance as its monitored instance (such as the shown examples in FIGS. 3B to 3D), the sorting criteria applied by each instance 112 may be designed to prevent at least two instances 112 hosted by a same computing node 110 from being sorted in adjacent positions. In an example, the sorting criteria may be configured as depending on both the IP addresses of the instances 112 and the respective identifications of the computing nodes 110 on which the respective instances 112 are hosted. The sorting criteria can be configured in any other manners as long as the instances hosted by a same computing node are not arranged in adjacent positions.

Figure 4A:
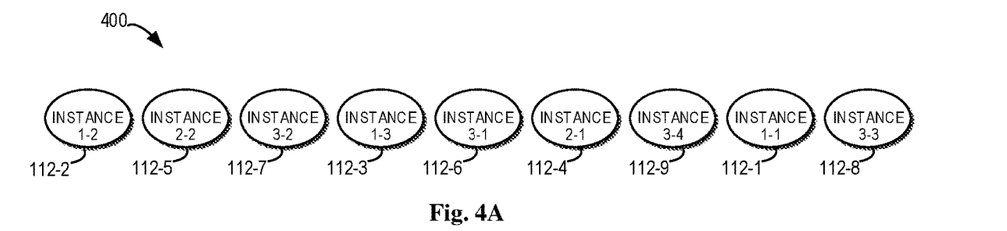
FIG. 4A illustrates an example sorting result of a cluster of instances according to some other example embodiments of the present disclosure.
Figure 4B:
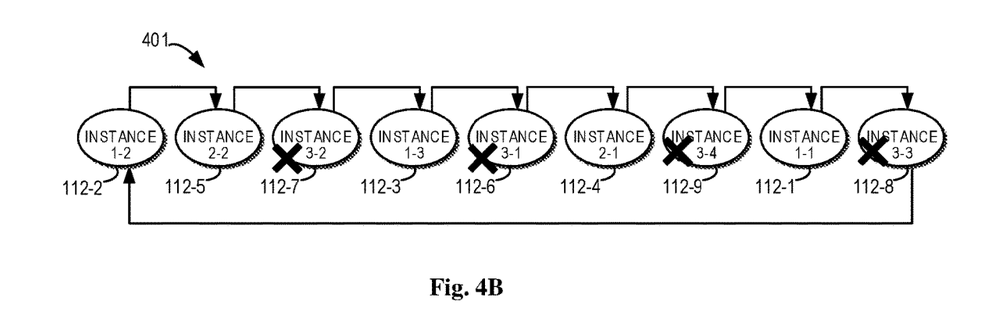
FIG. 4B illustrates an example monitoring relationship among a cluster of instances according to some other example embodiments of the present disclosure.

FIG. 4A illustrates an example sorting result 400 of the cluster of instances 112-1 to 112-9. In the example of FIG. 4A, those instances are sorted according to their IP addresses and the identifications of the computing nodes 110 such that no two adjacent instances in the sorting result 400 are hosted by the same node 110. By selecting the monitored instance for each instance according to the same selection criterion as used in the examples of FIGS. 3B to 3D, a monitoring relationship 401 among all the instances is shown in FIG. 4B. According to such monitoring relationship 401, if the computing node 110-3 is failed to cause all the four instances 112-6 to 112-9 hosted thereon failed, the failed status of all those four instances 112-6 to 112-9 can be detected by other active instances running on other computing nodes 110. Specifically, the instance 112-5 hosted by the computing node 110-2 can detect and report the failure of the instance 112-7, the instance 112-3 hosted by the computing node 110-1 can detect and report the failure of the instance 112-6, the instance 112-4 hosted by the computing node 110-2 can detect and report the failure of the instance 112-9, and the instance 112-1 hosted by the computing node 110-1 can detect and report the failure of the instance 112-8. As such, all the failed instances can be detected in a few round of detection, reducing the delay in the failure detection.

In addition to considering the instances 112 hosted by the same computing node 110, or as an alternative, in some example embodiments, the sorting criterion and/or the selection criteria may be configured based on other factors that potentially cause simultaneous failure of a plurality of instances 112, so as to avoid mutual monitoring among those instances 112. In an example embodiment, if one or more first instances 112 depend on a second instance 112 and failure of the second instance 112 may cause failure of the first instance(s) 112 due to their dependency, then the first and second instances 112 may not select each other to monitor. Toward this end, the instance sorting and/or the monitored instance selection performed by the instances 112 in the cluster can be specifically controlled by means of the sorting criterion and/or the selection criterion.

In some example embodiments, an apparatus capable of performing any of the process 200 (for example, the computing node 110 or the part of the computing node 110 running an instance 112) may comprise means for performing the respective steps of the process 200. The means may be implemented in any suitable form. For example, the means may be implemented in a circuitry or software module.

In some example embodiments, the apparatus comprises means for selecting, at a given instance of a cluster of instances of at least one service, at least one monitored instance from the cluster of instances according to a selection criterion such that each instance of the cluster of instances is selected as a monitored instance by at least one other instance of the cluster of instances; means for causing the given instance to detect an operational status of the at least one monitored instance; and means for providing, based on the operational status indicating that one of the at least one monitored instance is failed, the operational status of the failed monitored instance to a centralized controller for the cluster of instances.

In some example embodiments, the means for selecting the at least one monitored instance comprises means for sorting the cluster of instances according to a sorting criterion, the sorting criterion being shared by the cluster of instances; and means for selecting the at least one monitored instance from the cluster of sorted instances according to the selection criterion.

In some example embodiments, the means for sorting the cluster of instances comprises means for obtaining, from the centralized controller, information related to respective instances in the cluster of instances, the information comprising at least one of the following: respective access addresses of the respective instances, an identification of at least one computing node on which the respective instances are hosted, and an identification of the at least one service; and means for sorting the cluster of instances based on the obtained information.

In some example embodiments, the means for selecting the at least one monitored instance comprises means for selecting, from the cluster of ordered instances, an instance that is sorted to be adjacent to the given instance such that each instance of the cluster of instances is selected by an adjacent instance in the cluster of sorted instances.

In some example embodiments, the respective instances in the cluster are hosted by a plurality of computing nodes, and the means for sorting the cluster of instances comprises means for sorting the cluster of instances such that at least two of the cluster of instances hosted by a same computing node of the plurality of computing nodes are prevented from being sorted in adjacent positions.

In some example embodiments, the respective instances in the cluster are hosted by a plurality of computing nodes, and the means for selecting the at least one monitored instance comprises means for selecting the at least one monitored instance from the cluster of sorted instances such that at least two of the cluster of instances hosted by a first computing node of the plurality of computing nodes are selected by one or more instances hosted by at least one second computing node of the plurality of computing nodes, the at least one second computing node being different from the first computing node.

In some example embodiments, the apparatus further comprises: means for receiving cluster update information for the given instance from the centralized controller, the cluster update information indicating at least one of the following: at least one instance of the cluster of instances being deleted from the cluster, and at least one further instance of the at least one service or a further service being added into the cluster.

In some example embodiments, the apparatus further comprises means for performing other steps in some example embodiments of the process 200. In some example embodiments, the means comprises at least one processor; and at least one memory including computer program code, the at least one memory and computer program code configured to, with the at least one processor, cause the performance of the apparatus.

Figure 5:
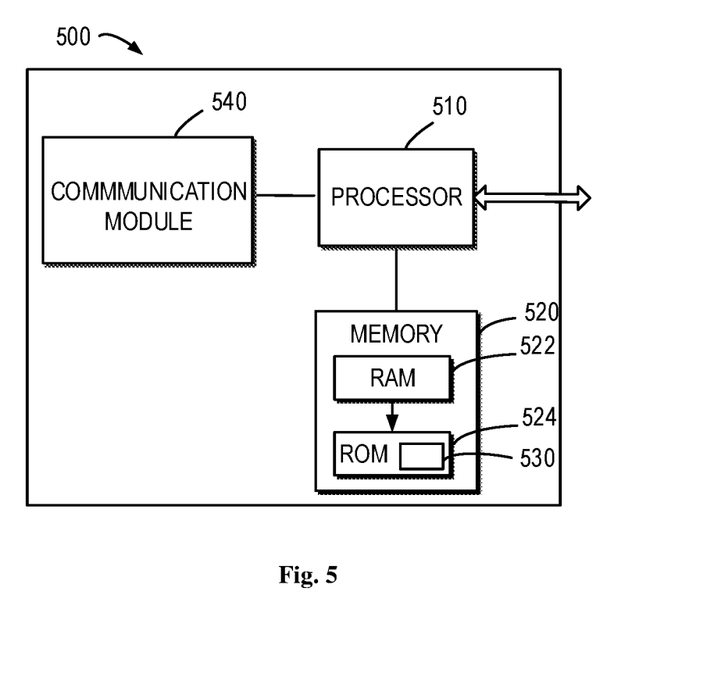
FIG. 5 illustrates a simplified block diagram of a device that is suitable for implementing example embodiments of the present disclosure.

FIG. 5 is a simplified block diagram of a device 500 that is suitable for implementing example embodiments of the present disclosure. The device 500 may be provided to implement a computing device, for example the computing node 110 as shown in FIG. 1 or a part of the computing node 110 that runs an instance 112. As shown, the device 500 includes one or more processors 510, one or more memories 520 coupled to the processor 510, and one or more communication modules 540 coupled to the processor 510.

The communication module 540 is for bidirectional communications. The communication module 540 has at least one antenna to facilitate communication. The communication interface may represent any interface that is necessary for communication with other network elements.

The processor 510 may be of any type suitable to the local technical network and may include one or more of the following: general purpose computers, special purpose computers, microprocessors, digital signal processors (DSPs) and processors based on multicore processor architecture, as non-limiting examples. The device 500 may have multiple processors, such as an application specific integrated circuit chip that is slaved in time to a clock which synchronizes the main processor.

The memory 520 may include one or more non-volatile memories and one or more volatile memories. Examples of the non-volatile memories include, but are not limited to, a Read Only Memory (ROM) 524, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 522 and other volatile memories that will not last in the power-down duration.

A computer program 530 includes computer executable instructions that are executed by the associated processor 510. The program 530 may be stored in the ROM 524. The processor 510 may perform any suitable actions and processing by loading the program 530 into the RAM 522.

The example embodiments of the present disclosure may be implemented by means of the program 530 so that the device 500 may perform any process of the disclosure as discussed with reference to FIGS. 2 to 4B. The example embodiments of the present disclosure may also be implemented by hardware or by a combination of software and hardware.

Figure 6:
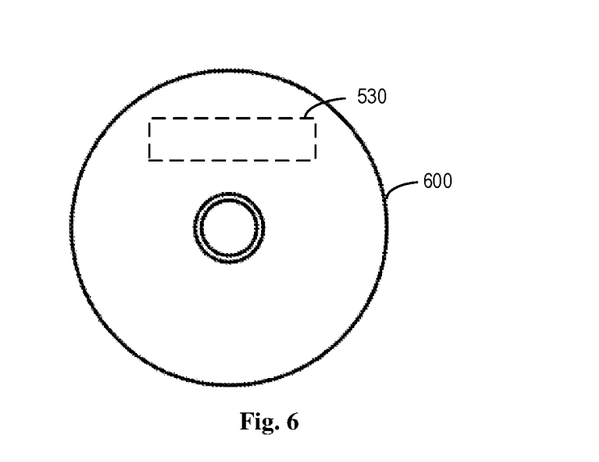
FIG. 6 illustrates a block diagram of an example computer readable medium in accordance with some example embodiments of the present disclosure.

In some example embodiments, the program 530 may be tangibly contained in a computer readable medium which may be included in the device 500 (such as in the memory 520) or other storage devices that are accessible by the device 500. The device 500 may load the program 530 from the computer readable medium to the RAM 522 for execution. The computer readable medium may include any types of tangible non-volatile storage, such as ROM, EPROM, a flash memory, a hard disk, CD, DVD, and the like. FIG. 6 shows an example of a computer readable medium 600 in form of CD or DVD. The computer readable medium has the program 530 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 500 as described above with reference to FIGS. 2 to 4B. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A computer-implemented method comprising:
at a given instance of a cluster of instances of at least one service, selecting at least one monitored instance from the cluster of instances according to a selection criterion such that each instance of the cluster of instances is selected as a monitored instance by at least one other instance of the cluster of instances, wherein the given instance, the cluster of instances, and the monitored instance are instances of a same service;
causing the given instance to detect an operational status of the at least one monitored instance; and
causing the given instance to provide, based on the operational status indicating that one of the at least one monitored instance is failed, the operational status of the failed monitored instance to a centralized controller for the cluster of instances.

2. The method of claim 1, wherein selecting the at least one monitored instance comprises:
sorting the cluster of instances according to a sorting criterion, the sorting criterion being shared by the cluster of instances; and
selecting the at least one monitored instance from the cluster of sorted instances according to the selection criterion.

3. The method of claim 2, wherein sorting the cluster of instances comprises:
obtaining, from the centralized controller, information related to respective instances in the cluster of instances, the information comprising at least one of the following:
respective access addresses of the respective instances,
an identification of at least one computing node on which the respective instances are hosted, and
an identification of the at least one service; and
sorting the cluster of instances based on the obtained information.

4. The method of claim 2, wherein selecting the at least one monitored instance comprises:
selecting, from the cluster of ordered instances, an instance that is sorted to be adjacent to the given instance such that each instance of the cluster of instances is selected by an adjacent instance in the cluster of sorted instances.

5. The method of claim 4, wherein the respective instances in the cluster are hosted by a plurality of computing nodes, and wherein sorting the cluster of instances comprises:
sorting the cluster of instances such that at least two of the cluster of instances hosted by a same computing node of the plurality of computing nodes are prevented from being sorted in adjacent positions.

6. The method of claim 4, wherein the respective instances in the cluster are hosted by a plurality of computing nodes, and wherein selecting the at least one monitored instance comprises:
selecting the at least one monitored instance from the cluster of sorted instances such that at least two of the cluster of instances hosted by a first computing node of the plurality of computing nodes are selected by one or more instances hosted by at least one second computing node of the plurality of computing nodes, the at least one second computing node being different from the first computing node.

7. The method of claim 1, further comprising:
receiving cluster update information for the given instance from the centralized controller, the cluster update information indicating at least one of the following:
at least one instance of the cluster of instances being deleted from the cluster, and
at least one further instance of the at least one service or a further service being added into the cluster.

8. An electronic device, comprising:
at least one processor; and
at least one memory including computer program code;
wherein the at least one memory and the computer program code are configured to, with the at least one processor, cause the device to:
at a given instance of a cluster of instances of at least one service, select at least one monitored instance from the cluster of instances according to a selection criterion such that each instance of the cluster of instances is selected as a monitored instance by at least one other instance of the cluster of instances, wherein the given instance, the cluster of instances, and the monitored instance are instances of a same service,
cause the given instance to detect an operational status of the at least one monitored instance, and
cause the given instance to provide, based on the operational status indicating that one of the at least one monitored instance is failed, the operational status of the failed monitored instance to a centralized controller for the cluster of instances.

9. The device of claim 8, wherein the at least one memory and the computer program code are configured to, with the at least one processor, cause the device to select the at least one monitored instance by:
sorting the cluster of instances according to a sorting criterion, the sorting criterion being shared by the cluster of instances; and
selecting the at least one monitored instance from the cluster of sorted instances according to the selection criterion.

10. The device of claim 9, wherein the at least one memory and the computer program code are configured to, with the at least one processor, cause the device to sort the cluster of instances by:
obtaining, from the centralized controller, information related to respective instances in the cluster of instances, the information comprising at least one of the following:
respective access addresses of the respective instances,
an identification of at least one computing node on which the respective instances are hosted, and
an identification of the at least one service; and
sorting the cluster of instances based on the obtained information.

11. The device of claim 9, wherein the at least one memory and the computer program code are configured to, with the at least one processor, cause the device to select the at least one monitored instance by:
selecting, from the cluster of ordered instances, an instance that is sorted to be adjacent to the given instance such that each instance of the cluster of instances is selected by an adjacent instance in the cluster of sorted instances.

12. The device of claim 11, wherein the respective instances in the cluster are hosted by a plurality of computing nodes, and wherein the at least one memory and the computer program code are configured to, with the at least one processor, cause the device to sort the cluster of instances by:
sorting the cluster of instances such that at least two of the cluster of instances hosted by a same computing node of the plurality of computing nodes are prevented from being sorted in adjacent positions.

13. The device of claim 9, wherein the respective instances in the cluster are hosted by a plurality of computing nodes, and wherein the at least one memory and the computer program code are configured to, with the at least one processor, cause the device to select the at least one monitored instance by:
selecting the at least one monitored instance from the cluster of sorted instances such that at least two of the cluster of instances hosted by a first computing node of the plurality of computing nodes are selected by one or more instances hosted by at least one second computing node of the plurality of computing nodes, the at least one second computing node being different from the first computing node.

14. The device of claim 8, wherein the at least one memory and the computer program code are configured to, with the at least one processor, further cause the device to:
receive cluster update information for the given instance from the centralized controller, the cluster update information indicating at least one of the following:
at least one instance of the cluster of instances being deleted from the cluster, and
at least one further instance of the at least one service or a further service being added into the cluster.

15. A non-transitory computer readable medium comprising program instructions for causing an apparatus to:
at a given instance of a cluster of instances of at least one service, select at least one monitored instance from the cluster of instances according to a selection criterion such that each instance of the cluster of instances is selected as a monitored instance by at least one other instance of the cluster of instances, wherein the given instance, the cluster of instances, and the monitored instance are instances of a same service,
cause the given instance to detect an operational status of the at least one monitored instance, and
causing the given instance to provide, based on the operational status indicating that one of the at least one monitored instance is failed, the operational status of the failed monitored instance to a centralized controller for the cluster of instances.

16. The non-transitory computer readable medium of claim 15, wherein the program instructions further cause the apparatus to select the at least one monitored instance by:
sorting the cluster of instances according to a sorting criterion, the sorting criterion being shared by the cluster of instances; and
selecting the at least one monitored instance from the cluster of sorted instances according to the selection criterion.

17. The non-transitory computer readable medium of claim 16, wherein the program instructions further cause the apparatus to sort the cluster of instances by:
obtaining, from the centralized controller, information related to respective instances in the cluster of instances, the information comprising at least one of the following:
respective access addresses of the respective instances,
an identification of at least one computing node on which the respective instances are hosted, and
an identification of the at least one service; and
sorting the cluster of instances based on the obtained information.

18. The non-transitory computer readable medium of claim 16, wherein the program instructions further cause the apparatus to select the at least one monitored instance by:
selecting, from the cluster of ordered instances, an instance that is sorted to be adjacent to the given instance such that each instance of the cluster of instances is selected by an adjacent instance in the cluster of sorted instances.

19. The non-transitory computer readable medium of claim 18, wherein the respective instances in the cluster are hosted by a plurality of computing nodes, and wherein the program instructions further cause the apparatus to sort the cluster of instances by:
sorting the cluster of instances such that at least two of the cluster of instances hosted by a same computing node of the plurality of computing nodes are prevented from being sorted in adjacent positions.

20. The non-transitory computer readable medium of claim 16, wherein the respective instances in the cluster are hosted by a plurality of computing nodes, and wherein the program instructions further cause the apparatus to select the at least one monitored instance by:
selecting the at least one monitored instance from the cluster of sorted instances such that at least two of the cluster of instances hosted by a first computing node of the plurality of computing nodes are selected by one or more instances hosted by at least one second computing node of the plurality of computing nodes, the at least one second computing node being different from the first computing node.

* * * * *